Jan. 28, 1969     KARL-HEINZ WOLFRAM     3,424,019
MEANS FOR FITTING ENDLESS FLAT BELTS ON
DRIVES AT FIXED DISTANCES APART
Filed April 3, 1967

INVENTOR
KARL-HEINZ WOLFRAM
BY Beale and Jones
ATTORNEYS 3,424,019

MEANS FOR FITTING ENDLESS FLAT BELTS ON DRIVES AT FIXED DISTANCES APART
Karl-Heinz Wolfram, Eibelstadt, near Wurzburg, Germany, assignor of one-half to Schnellpressenfabrik Koenig & Bauer Aktiengesellschaft, Wurzburg, Germany
Filed Apr. 3, 1967, Ser. No. 628,137
U.S. Cl. 74—230.4     6 Claims
Int. Cl. F16h 55/38, 55/56

ABSTRACT OF THE DISCLOSURE

A belt drive member is provided with an internal cone into which a displaceable sleeve mounted on a shaft stub and provided with an outer cone which runs concentrically with the shaft stub, is drawn into the belt drive member by a central screw in the shaft stub. The shaft stub is formed on the end of a shaft as a reduced diameter portion so that a shoulder is provided between the shaft and its shaft stub. Axial displacement of the belt drive member is prevented by an annular retaining or stop place received on the shaft stub at the shoulder. When the force resulting from the power output to be transmitted exceeds the peripheral force acting between the belt drive member and the displaceable sleeve, a make-up key or keys symmetrically placed therebetween may be utilized.

BACKGROUND OF THE INVENTION

When endless flat belts are used for the transmission of a contact pressure to belt pulleys the contact pressure is obtained by elongation of the flat belt. With non-adjustable centre-to-centre distances, the length of the flat belt has to be shortened during manufacture to allow for the elongation required to attain the required contact pressure.

Flat belts running at a determined initial tension are frequently constructed as multiple layer flat belts comprising a running or bearing surface and a tension layer which, in some constructions, is covered with a covering layer. The running surface transmits the power output by friction. The tension layer is provided for the absorption of the tension occurring in the flat belt.

The invention relates to apparatus by which endless flat belts running with initial tension may be placed upon drives such as pulleys provided at non-adjustable, and particularly short centre-to-centre distances apart.

There are several known means and methods for fitting endless flat belts required to run under tension on drive means, such as pulleys, positioned at determined and fixed distances apart.

Thus in one method a part of the pulley is removed and then re-assembled, in another the flat belt is sprung on to the pulley by using a rigid guide member, in another an eccentric tensioning device is used, in a fourth method initial tensioning with a tension lock is used and in a fifth method screw-on cones provided with a cylindrical lug are employed.

All of these methods have disadvantages. The first two methods and apparatus are suitable only for apparatus in which the centre-to-centre distances of the pulleys are relatively large and even in such apparatus the flat belt may be overstrained; in the third case the manufacture of an eccentric tensioning device presents difficulty except with shafts having diameters within determined limits; in the fourth and fifth of the known methods it is a disadvantage that the loose parts are easily lost since the flat belts are not changed very frequently.

SUMMARY OF THE INVENTION

It is among the objects of the invention to provide a construction which avoids or minimises the disadvantages of known constructions.

In the construction of the invention the flat belt pulley is provided with an internal cone in which a displaceable sleeve mounted on the shaft stub and provided with an outer cone which runs concentrically with the shaft stub, is drawn by a central screw, axial displacement of the flat belt pulley being prevented by a retaining or stop plate. When the force resulting from the power output to be transmitted exceeds the peripheral force acting upon the outer cone, the latter may be provided with a make-up key or with two keys for reasons of symmetry. The retaining or stop plate is supported by a collar, or the like, on the shaft stub.

A device according to the invention affords the following advantages:

It consists exclusively of axially symmetrical parts, so that unbalance of the parts is avoided; even with pulleys which have a small diameter, the flat belt pulley can be moved radially to the shaft stub by an adequate amount, so that the flat belt may be applied conveniently and without the risk of damage; the position of the flat belt pulley is obtained by screwing-in the central tightening screw as far as the stop. This operation may be carried out correctly even by machine fitters who are not familiar with the machine; the slack flat belt is applied at the correct position and is thus not stressed by lateral forces; the flat belt is not bent over any sharp edges upon being applied; the parts required for tensioning remain in the assembled position after completed tensioning and are thus immediately available even after an interval of years.

DESCRIPTION OF THE DRAWING

One construction according to the invention is illustrated by way of example in the accompanying diagrammatic drawings, in which.

DESCRIPTION OF THE PREFERRED EMBODIMENT

Figure 1:
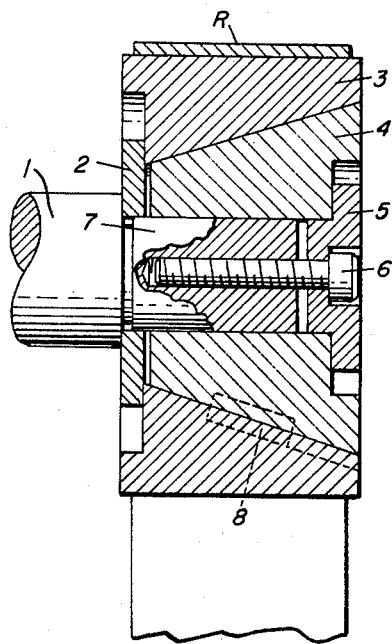
FIGURE 1 is a sectional elevation of the flat belt pulley in the assembled position.

In the construction illustrated in the drawings the flat belt to be applied is denoted by the reference letter R.

A shaft 1 merges into a shaft stub 7 (FIGURE 1). A stop plate 2 passed radially through the shaft stub 7 bears against the shoulder resulting from the difference in diameter between the shaft and the stub. A flat belt pulley 3 provided with a conical bore bears against the plate 2. The pulley is guided by the outer cone of a sleeve 4. A pressure plate 5 is held centrally in position in the sleeve 4 by a register or fitting lug 9. The force generated by a screw 6 threadedly received axially in shaft stub 7 is transmitted to the sleeve 4 by the pressure plate 5. The tangential force generated on the outer cone of the sleeve 4 is transmitted to the flat belt pulley 3 by make-up keys 8.

Figure 2:
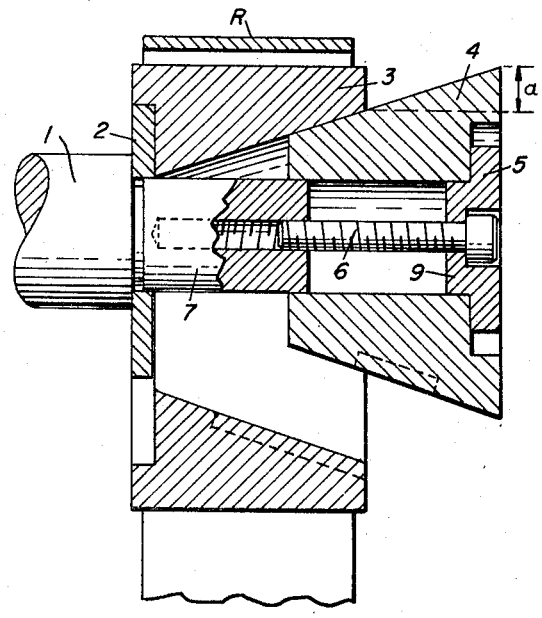
FIGURE 2 shows the flat belt pulley in the position in which it is displaced radially to the shaft stub by the amount $a$ upon application of the flat belt.

FIGURE 2 shows the position of the flat belt pulley relative to the shaft stub during a belt changing operation. The flat belt pulley may be moved radially relative to the shaft stub by the amount $a$, so that the extent of initial tension may be increased to almost the amount $2a$. The flat belt is tightened by screwing-in a screw 6 after completed insertion of the sleeve 4 and the pressure plate 5.

What I claim is:

1. A pulley for mounting on a shaft having a reduced shaft stub end forming a shoulder therebetween, comprising in combination, an annular plate received on said shaft stub against said shoulder, an annular belt drive member having an internal cone surface with wide end extending towards shaft stub end and received on said shaft stub against said annular plate, a displaceable sleeve received on said shaft stub within said annular belt drive member and having an outer cone surface which is concentric with the shaft stub, said outer cone surface of the sleeve being slidable against the internal cone surface of the pulley member to center it with respect to said shaft stub and means attached to said shaft stub and bearing against the end of the sleeve for drawing the sleeve onto the shaft stub to center the pulley member on said shaft stub.

2. A pulley according to claim 1 wherein the internal cone surface of the annular belt drive member has substantially the same angle as the outer cone of the sleeve.

3. A pulley according to claim 1 wherein at least one make-up key is disposed between the internal cone of the belt drive member and the displaceable sleeve.

4. A pulley according to claim 1 wherein the means attached to said shaft stub and bearing against the end of the sleeve for drawing the sleeve onto the shaft stub comprises a screw received in a threaded aperture in the end of the shaft stub and a pressure plate urged by the screw against the sleeve.

5. A pulley according to claim 4 wherein said sleeve has a recess in its outer end for receiving said pressure plate and said pressure plate is radially guided therein.

6. A pulley according to claim 5 wherein said belt drive member at its end adjacent said annular plate has a circular recess therein larger than and for receiving said annular plate whereby on sliding said sleeve out from said belt drive member said belt drive member is guided in radial movement by said annular plate.

References Cited

UNITED STATES PATENTS

| | | | |
|---|---|---|---|
| 965,160 | 7/1910 | Cullman | 74—230.21 |
| 1,580,919 | 4/1926 | Reeves | 74—230.3 |
| 1,706,562 | 3/1929 | Dake | 74—230.01 XR |
| 2,465,471 | 3/1949 | Packer | 287—52.06 |
| 2,632,334 | 3/1953 | Williams | 74—230.3 |
| 2,718,155 | 9/1955 | Firth | 287—52.06 XR |

FRED C. MATTERN, JR., *Primary Examiner.*

JAMES A. WONG, *Assistant Examiner.*

U.S. Cl. X.R.

287—52.06